(12) United States Patent
Takao et al.

(10) Patent No.: US 7,681,683 B2
(45) Date of Patent: Mar. 23, 2010

(54) SEATBELT RETRACTOR

(75) Inventors: Masato Takao, Minato-ku (JP); Koji Tanaka, Minato-ku (JP); Daisuke Murakami, Minato-ku (JP)

(73) Assignee: Takata Corporation, Tokyo (JP)

( * ) Notice: Subject to any disclaimer, the term of this patent is extended or adjusted under 35 U.S.C. 154(b) by 102 days.

(21) Appl. No.: 12/076,739

(22) Filed: Mar. 21, 2008

(65) Prior Publication Data
US 2008/0231036 A1    Sep. 25, 2008

(51) Int. Cl.
*B60R 22/34* (2006.01)
*B60R 22/48* (2006.01)

(52) U.S. Cl. ............ 180/268; 242/390.9; 280/807
(58) Field of Classification Search .......... 180/268; 280/807, 806; 242/390.9, 390, 390.8; 297/474, 297/475, 476, 477, 478, 481
See application file for complete search history.

(56) References Cited

U.S. PATENT DOCUMENTS

| | | | | |
|---|---|---|---|---|
| 4,666,097 | A * | 5/1987 | Tsuge et al. ............ 242/390.1 |
| 4,669,680 | A * | 6/1987 | Nishimura et al. ...... 242/375.3 |
| 4,708,365 | A * | 11/1987 | Nakano et al. .......... 280/801.1 |
| 4,714,274 | A * | 12/1987 | Nagashima ............. 280/801.1 |
| 4,787,569 | A * | 11/1988 | Kanada et al. ............ 242/371 |
| 6,374,938 | B2 | 4/2002 | Yano et al. |
| 6,726,249 | B2 * | 4/2004 | Yano et al. ............... 280/805 |
| 6,827,308 | B2 * | 12/2004 | Fujii et al. .............. 242/390.9 |
| 7,308,348 | B2 * | 12/2007 | Tanaka et al. .............. 701/45 |
| 7,397,208 | B2 * | 7/2008 | Tanaka et al. ............. 318/264 |
| 7,416,149 | B2 * | 8/2008 | Koide et al. .............. 242/374 |
| 7,431,119 | B2 * | 10/2008 | Tanaka .................... 180/268 |
| 7,517,025 | B2 * | 4/2009 | Tanaka et al. ............. 297/477 |
| 2006/0022079 | A1 * | 2/2006 | Koide et al. ............. 242/390.8 |
| 2006/0065771 | A1 * | 3/2006 | Takao et al. .............. 242/374 |
| 2006/0071537 | A1 * | 4/2006 | Tanaka et al. ............. 297/477 |
| 2006/0175453 | A1 * | 8/2006 | Takao et al. .............. 242/374 |
| 2006/0220368 | A1 * | 10/2006 | Takao et al. ............. 280/801.1 |
| 2006/0261589 | A1 * | 11/2006 | Tanaka .................... 280/806 |
| 2006/0289219 | A1 * | 12/2006 | Tanaka .................... 180/268 |
| 2006/0290131 | A1 * | 12/2006 | Tanaka .................... 280/807 |
| 2007/0046015 | A1 * | 3/2007 | Tanaka et al. ............. 280/806 |
| 2007/0084955 | A1 * | 4/2007 | Tanaka et al. ............. 242/374 |

(Continued)

FOREIGN PATENT DOCUMENTS

EP    1818225 A1    8/2007

(Continued)

*Primary Examiner*—Ruth Ilan
*Assistant Examiner*—Jordan Golomb
(74) *Attorney, Agent, or Firm*—Foley & Lardner LLP (57) ABSTRACT

A seat belt retractor includes a seat belt winding device for winding up a seat belt by actuation of a motor and a control unit. The control unit, under a predetermined condition, repeats a process of stopping the actuation of the motor when an overload of the motor is detected and restarting the actuation of the motor after a lapse of a predetermined time period. The control unit includes a timer for clocking the time period from the start to the stop of the actuation of the motor, a counter for counting up the number of times of starting the actuation of the motor, and a determination module that based on the result of the timer and the counter determines whether or not actuation of the motor, which is stopped by the detection of an overload, is to be restarted.

7 Claims, 7 Drawing Sheets

U.S. PATENT DOCUMENTS

| | | | |
|---|---|---|---|
| 2007/0114775 A1 * | 5/2007 | Inuzuka et al. | 280/807 |
| 2008/0238076 A1 * | 10/2008 | Takao et al. | 280/807 |
| 2009/0243367 A1 * | 10/2009 | Tanaka et al. | 297/475 |

FOREIGN PATENT DOCUMENTS

| | | |
|---|---|---|
| JP | 2005-219535 | 8/2005 |
| JP | 2005-280497 | 10/2005 |
| JP | 2006-76351 | 3/2006 |

* cited by examiner

SEATBELT RETRACTOR

BACKGROUND

The invention relates to a safety arrangement for motor vehicles, which safety arrangement, in a crash, in particular a crash from the side, is intended to avoid the situation where an additional load is placed on a vehicle occupant because of an interaction between a motor vehicle seat and the occupant situated on the seat. In addition, the present invention may relate to motor vehicle seats with rigid and/or pronounced side bolsters.

The present invention relates generally to the field of seat belt winding. Particularly, the present invention relates to a seat belt retractor for winding up a seat belt by a motor, a seat belt apparatus with the seat belt retractor, and a method of winding up a seat belt by a motor.

A vehicle, such as an automobile, typically includes a seat belt apparatus for restraining an occupant in a seat. The seat belt apparatus may include a seat belt or webbing, a buckle, a tongue plate, and a retractor.

The retractor is a device for winding up the seat belt and may include a winding mechanism using spring force and a pretensioner that moves a piston by explosion of a powder or other material to strongly pull the belt in the event of an emergency, such as a vehicle collision, to restrain the occupant in the seat. A motorized retractor may include a motor to wind up the seat belt.

To reduce the electric power consumption, the motorized retractor may be adapted so that electric power is supplied to the motor when winding up the seat belt and the supply of the electric power to the motor is stopped and the motor is turned off after winding-up the seat belt. However, when the seat belt is caught by something such as an arm of the occupant during the winding-up of the seat belt or when the occupant starts the withdrawal of the seat belt during wind-up of the seat belt, the motor may not be suitably controlled to stop.

SUMMARY

One embodiment of the invention relates to a seat belt retractor. The seat belt retractor includes a seat belt winding device for winding up a seat belt by actuation of a motor and a control unit. The control unit, under a predetermined condition, repeats a process of stopping the actuation of the motor when an overload of the motor is detected and restarting the actuation of the motor after a lapse of a predetermined time period. The control unit includes a timer for clocking the time period from the start to the stop of the actuation of the motor, a counter for counting up the number of times of starting the actuation of the motor, and a determination module that based on the result of the timer and the counter determines whether or not actuation of the motor, which is stopped by the detection of an overload, is to be restarted.

Another embodiment of the invention relates to a seat belt winding method for repeating, under a predetermined condition, a process of stopping the actuation of a motor, which provides power for winding up a seat belt, when an overload of the motor is detected and restarting the actuation of the motor after a lapse of a predetermined time period. The method includes the steps of clocking a time period from the start to the stop of the actuation of the motor, counting up the number of times of starting the actuation of the motor, and determining whether or not actuation of the motor, which was stopped by the detection of the overload, is to be restarted based on the result obtained in the clocking step and the result obtained in the counting step.

DETAILED DESCRIPTION

According to an exemplary embodiment a motorized retractor may be used, for example as is disclosed in JP-A-2005-280497 and which is herein incorporated by reference in its entirety. The motorized retractor is configured to operate in a standby state where the winding-up of the seat belt is stopped for a predetermined time period when an overload is detected during the winding-up of the seat belt and restarts the winding-up after a lapse of the predetermined time period. The motorized retractor may be able to suitably handle a case where the seat belt is caught and a case where the withdrawal of the seat belt is started by the occupant during the winding-up.

At the completion of the winding-up of the seat belt an overload may be detected, similar to when the seat belt is caught by something. Since the retractor may conduct the wind-up action a predetermined number of times, the motor may be driven to conduct the wind-up even when the seat belt is completely wound-up.

According to another exemplary embodiment, a seat belt retractor can precisely detect a state where the winding-up may not be possible (e.g., when the winding-up is completed, when it may not be possible to release the catching of the seat belt during the winding up of the seat belt, etc.) and thus enables a more efficient wind-up of the seat belt. A seat belt apparatus may include the seat belt retractor and operate based on a method of winding up the seat belt.

According to one exemplary embodiment, a seat belt retractor includes a seat belt winding device for winding up a seat belt by actuation of a motor and a control unit that repeats, under a predetermined condition, a process of stopping the actuation of the motor when an overload of the motor is detected and restarting the actuation of the motor after a lapse of a predetermined time period. The control unit includes a timer for clocking the time period from the start to the stop of the actuation of the motor, a counter for counting up the number of times of starting the actuation of the motor, and a determination module that determines, based on the result of the clocking by the timer and the result of the counting by the counter, whether or not actuation of the motor, which was stopped by the detection of the overload, is to be restarted.

The determination module may determine that actuation of the motor is not to be restarted when a time period as the result of the clocking by the timer is shorter than a predetermined time period a plurality of times in a row.

The determination module may determine that actuation of the motor is not to be restarted when the actuation of the restarted motor is stopped by the detection of the overload and a time period as the result of the clocking by the timer is shorter than a predetermined time period.

According to another exemplary embodiment, a seat belt apparatus includes a seat belt, a tongue plate that is slidably attached to the seat belt, a buckle to which the tongue plate is inserted and latched, and the seat belt retractor.

According to another exemplary embodiment, a seat belt winding method may repeat, under a predetermined condition, a process of stopping the actuation of a motor (which provides power for winding up a seat belt) when an overload of the motor is detected during the actuation of the motor and restarting the actuation of the motor after a lapse of a predetermined time period. The method includes the steps of clocking the time period from the start to the stop of the actuation of the motor, counting up the number of times of starting the actuation of the motor, and determining, based on the result obtained in the motor actuation timing step and the result obtained the motor actuation counting step, whether or not actuation of the motor, which was stopped by the detection of the overload, is to be restarted.

In the determining step of the seat belt winding method, it may be determined that actuation of the motor is not to be restarted when a time period as the result obtained the motor actuation timing step is shorter than a predetermined time period a plurality of times in a row.

In the determining step of the seat belt winding method, it may be determined that actuation of the motor is not to be restarted when the actuation of the restarted motor is stopped by the detection of the overload and a time period as the result obtained in the timer is shorter than a predetermined time period.

The state where it may not be possible to wind up the seat belt (e.g., when the winding-up of the seat belt is completed, when it may not be possible to release the catching of the seat belt, etc.) may be more precisely detected, thereby enabling efficient winding-up action of the seat belt.

Hereinafter, embodiments of a seat belt retractor according to the invention will be described with reference to attached drawings.

Figure 1:
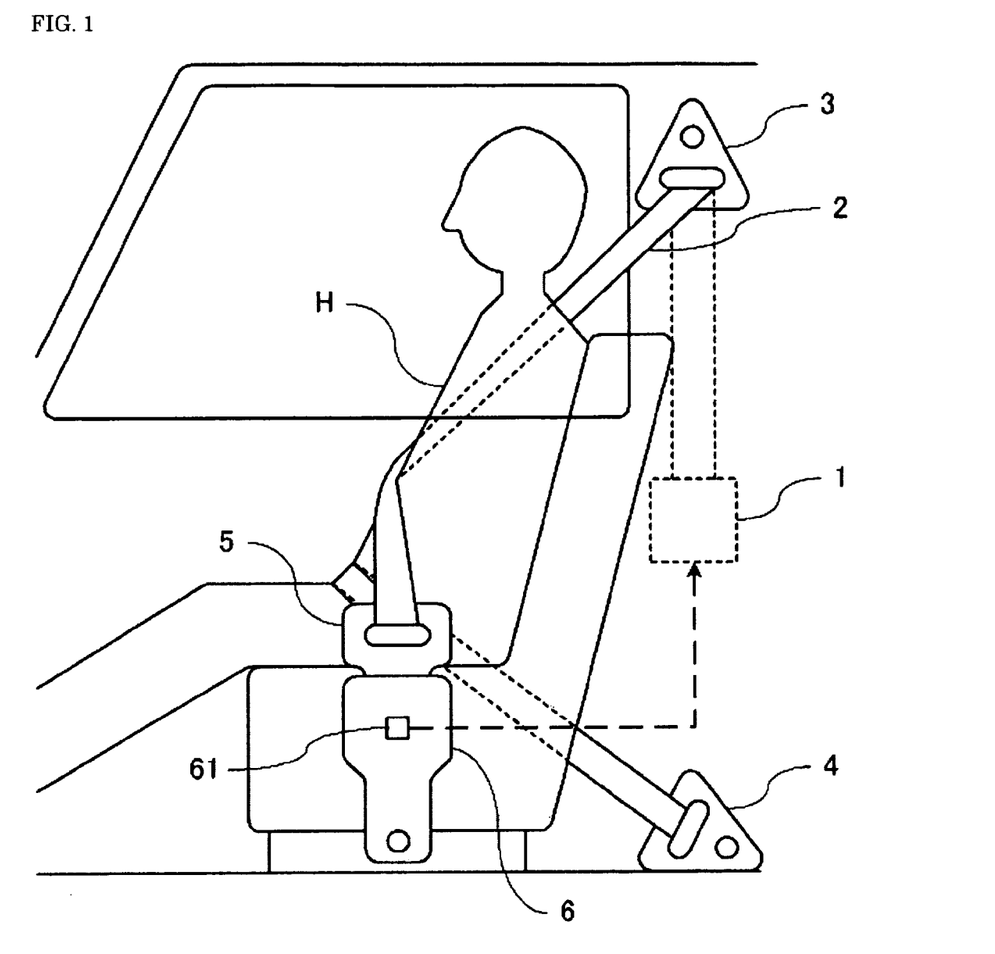
FIG. 1 is a schematic illustration showing an arrangement of a seat belt apparatus comprising a seat belt retractor according to a first exemplary embodiment.

FIG. 1 is an illustration schematically showing an arrangement of a seat belt apparatus including a seat belt retractor according to an exemplary embodiment. The seat belt apparatus is attached to a vehicle seat and comprises a seat belt retractor 1, a seat belt 2, a deflection fitting 3, a belt anchor 4, a tongue plate 5, and a buckle 6.

The seat belt retractor 1 is a device of winding up the seat belt 2 by power of a motor and is fixed to an interior part of a side wall of a vehicle body. One end of the seat belt 2 is attached to the seat belt retractor 1 and the other end of the seat belt 2 passes through the deflection fitting 3, which is disposed around an upper portion of a center pillar and is attached to the belt anchor 4 which is fixed in the vicinity of the seat belt retractor 1.

The tongue plate 5 is supported by the seat belt 2 such that the tongue plate 5 is slidable in a predetermined range from a turn at the deflection fitting 3 to the belt anchor 4. The buckle 6 is fixed to the seat (or a floor of the vehicle body) and has a structure to which the tongue plate 5 is inserted and latched. The buckle 6 includes a seat belt wearing sensor 61 which detects the latching of the tongue plate 5 so as to detect the wearing or cancellation of the wearing of the seat belt 2. The seat belt wearing sensor 61 outputs a detected signal to the seat belt retractor 1 via a wire.

When getting on the vehicle, an occupant H sits down on the seat, then withdraws the seat belt 2 from the seat belt retractor 1 and inserts the tongue plate 5 into the buckle 6 to latch the buckle 6 with the tongue plate 5. Accordingly, the seat belt 2 is worn by the occupant H so that the upper part and lap part of the occupant H are restrained relative to the seat. As the seat belt wearing sensor 61 detects the latching of the tongue plate 5, the seat belt wearing sensor 61 outputs a signal indicating the wearing (hereinafter, referred to as "wearing signal") to the seat belt retractor 1.

When getting off the vehicle, the occupant H releases the tongue plate 5 from the buckle 6. Then, the seat belt wearing sensor 61 outputs a signal indicating the cancellation of the wearing (hereinafter, referred to as "cancellation signal") to the seat belt retractor 1. As the seat belt retractor 1 receives this cancellation signal, the seat belt retractor 1 actuates the motor so as to start the action of winding up the seat belt 2.

Figure 2:
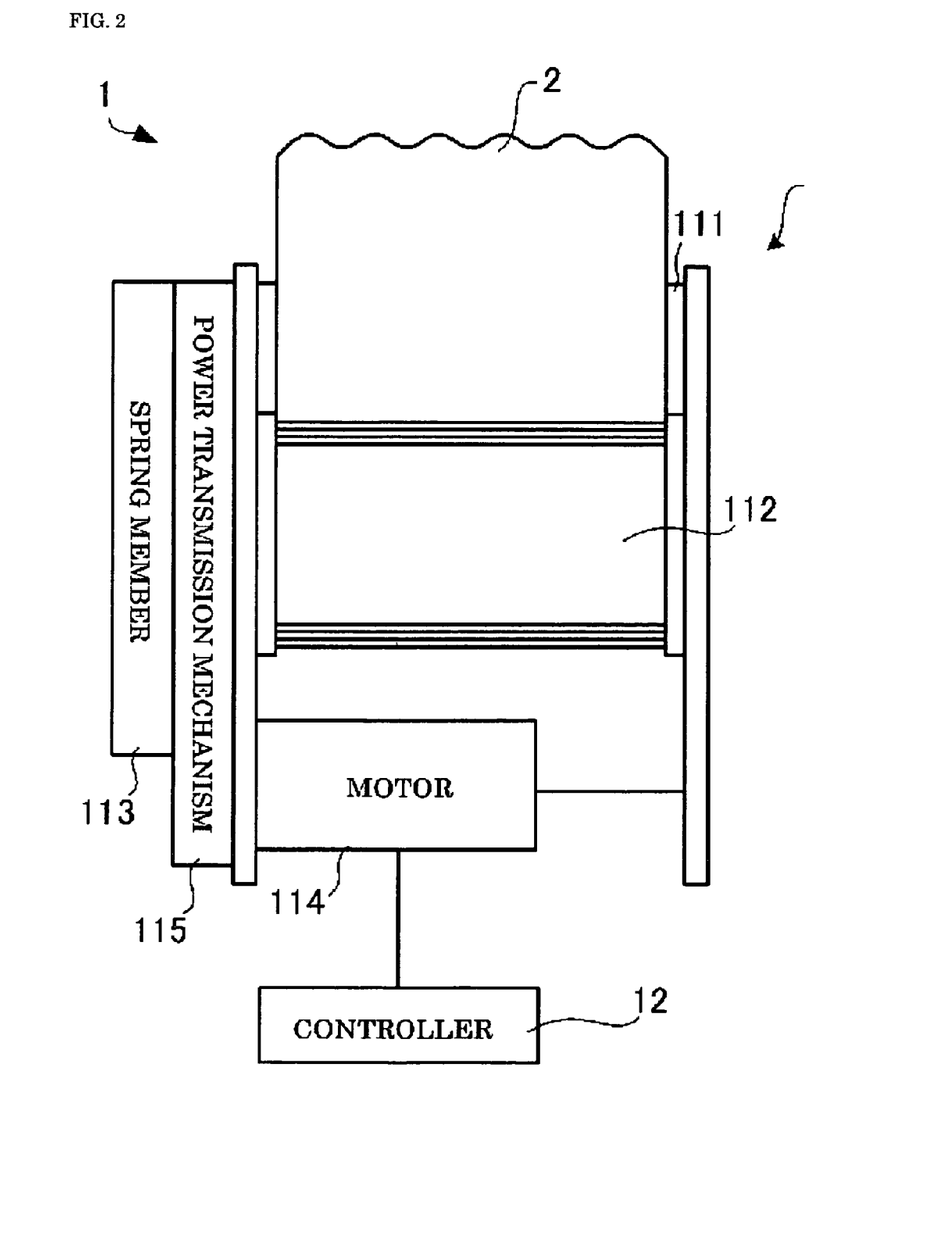
FIG. 2 is a schematic illustration showing an arrangement of the seat belt retractor according to the first exemplary embodiment.

FIG. 2 is an illustration schematically showing the structure of the seat belt retractor 1. As shown in FIG. 2, the seat belt retractor 1 comprises a winding unit 11, which includes a frame 111, a spool 112, a spring member 113, a motor 114, and a power transmission mechanism 115, and a control unit 12.

The spool 112 is rotatably supported by the U-like shaped frame 111. Attached to the outer surface of the spool 112 is an end of the seat belt 2. The spool 112 is rotated by the driving force of the motor 114 and the seat belt 2 is wound up by the seat belt retractor 1.

The spring member 113 biases the spool 112 in the winding direction by spring force. The spring member 113 is supported by the frame 111 and is connected to the spool 112 via the power transmission mechanism 115.

The motor 114 is an electric motor for rotating the spool 112 and is supported by the frame 111. The power transmission mechanism 115 and the motor 114 are supported by the frame 111. The power transmission mechanism is arranged between the motor 114 and the spool 112 to transmit the power of the motor 114 to the spool 112 to vary the speed (e.g., reducing the speed, increasing the speed, etc.). The power transmission mechanism 115 comprises a spool-side pulley that is fixed to the rotary shaft of the spool 112, a motor-side pulley that is fixed to the rotary shaft of the motor 114, and a timing belt that is laid to extend between the pulleys with some tension (not all pulleys are shown). The power transmission mechanism 115 also has a clutch function so to cancel the connection between the motor 114 and the spool 112 when the motor 114 is not actuated to allow the withdrawal of the seat belt 2 from the spool 112.

Figure 3:
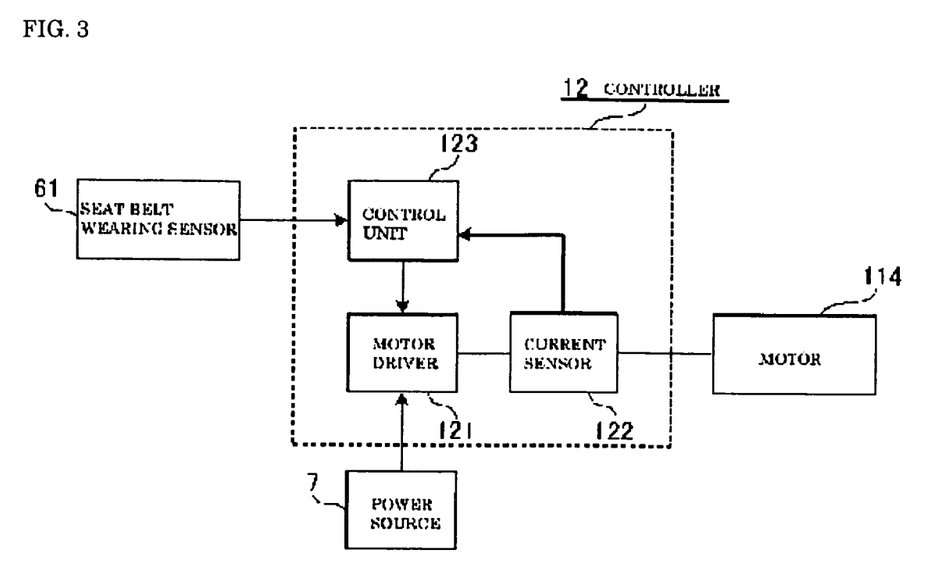
FIG. 3 is a block diagram showing an arrangement of a control unit and a connection thereof.

Referring to FIG. 3, the control unit 12 controls the actuation of the motor 114 and comprises a motor driver 121, a current sensor 122, and a control unit 123. The control unit 12 is connected to the motor 114, a power source 7 for supplying the power for the motor 114, and the seat belt wearing sensor 61 via wires.

The motor driver 121 is connected to the power source 7 so that power supply voltage from the power source 7 is applied to the motor driver 121. The power source 7 may be a battery equipped on the vehicle. The motor driver 121 applies voltage to the motor 114 to actuate the motor 114 according to the control by the control unit 123.

The current sensor 122 is disposed between the motor driver 121 and the motor 114 to detect a value of current flowing through the motor 114. The current sensor 122 outputs a detected current value to the control unit 123.

The control unit 123 comprises a CPU (Central Processing Unit) that carries out a control program, a ROM (Read Only Memory) that stores the control program, a control parameter table or the like, and a RAM (Random Access Memory) that is used as a work area when the control program is carried out.

The control unit 123 controls the motor driver 121 according to control parameters for controlling the motor 114 (e.g., from the control parameter table), thereby controlling the motor 114 via the motor driver 121. Specifically, the control unit 123 controls the rotation of the motor 114 by PWM (Pulse Width Modulation). The control unit 123 generates a PWM signal of a predetermined duty ratio and outputs the generated PWM signal and a control signal indicating the rotational direction of the motor 114 to the motor driver 121. The motor driver 121 applies driving voltage, obtained by adjusting the power supply voltage according to the PWM signal, to the motor 114. Accordingly, the motor 114 rotates at a speed according to the predetermined duty ratio so that the seat belt 2 is wound up onto the spool 112.

The seat belt retractor 1 has a function (hereinafter, referred to as "retry function") for restarting the winding up of the seat belt 2 such that the winding-up of the seat belt 2 is stopped, for example, when the seat belt 2 is caught by the body of the occupant H, the seat, or a door during the action of winding up the seat belt 2 and is restarted after a lapse of a predetermined time period from the stopping.

Figure 4:
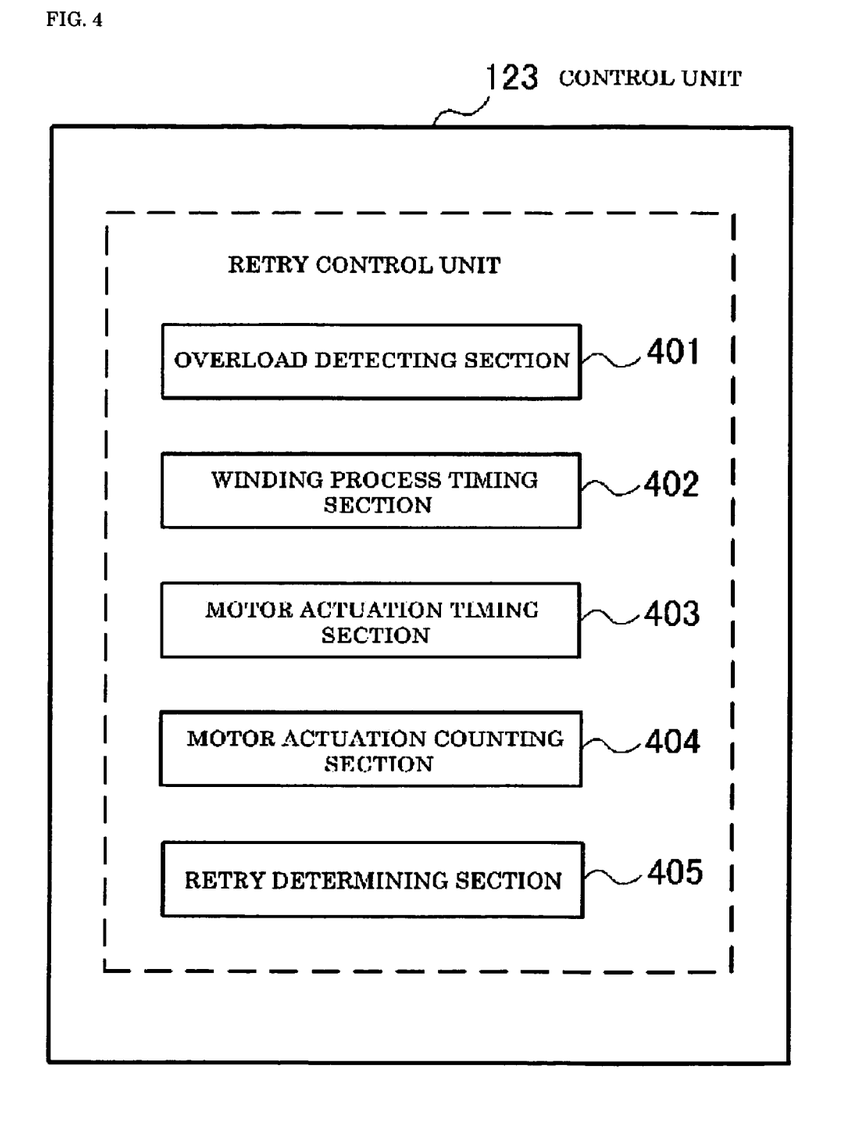
FIG. 4 is a block diagram showing an arrangement of a retry control unit of the control unit shown in FIG. 3.

Referring to FIG. 4, the control unit 123 comprises a retry control unit for controlling the retry function. The retry control unit comprises an overload detecting section 401, a winding process timing section 402, a motor actuation timing section 403, a motor actuation counting section 404, and a retry determining section 405.

The overload detecting section 401 detects an overload applied to the motor 114 caused by the completion of wind-up, the catching of the seat belt by the body of the occupant H, the seat, or the door, or the start of withdrawal of the seat belt 2 by the occupant H. As the overload is detected the control unit 123 commands the motor driver 121 (e.g., outputs a stopping signal) to stop the actuation (e.g., the rotation) of the motor 114. The overload detecting section 401 compares a current value (e.g., a motor current value) detected by the current sensor 122 with a predetermined current value (e.g., a current threshold for detecting overload) and determines that the overload is detected when the motor current value is equal to or more than the current threshold for detecting overload (for example 5 amperes).

The winding process timing section 402 clocks the operating time period (e.g., execution time period) of the seat belt winding process by the seat belt retractor 1. The winding process timing section 402 may be a software timer, a hardware timer, or any combination thereof. The winding process timing section 402 starts the clocking at the point of receiving the cancellation signal from the seat belt wearing sensor 61 (e.g., at the point of starting the seat belt winding-up process) and continues the clocking until the seat belt winding-up process is terminated. The clocking may be continued even when the motor 114 is stopped.

The motor actuation timing section 403 clocks the actuation (e.g., rotation) time period of the motor 114. The motor actuation timing section 403 may be a software timer, a hardware timer, or any combination thereof. The motor actuation timing section 403 starts the clocking at the point when the control unit 123 outputs an actuation signal (e.g., PWM signal, a control signal indicating the rotational direction of the motor 114, etc.) to the motor driver 121 and terminates the clocking at the point when the control unit 123 outputs a stopping signal to the motor driver 121. The result of the clocking of the motor actuation timing section 403 (e.g., a motor actuating time period) is used in the retry determining section 405.

The motor actuation counting section 404 may be a counter for counting the number of times of starting the actuation of the motor 114 (e.g., a motor actuation number).

After an overload is detected by the overload detecting section 401 and the actuation of the motor 114 is stopped, the retry determining section 405 determines whether or not it is required to actuate the motor 114 again, in other words, whether or not the seat belt 2 is to be wound-up again (retry judgment). In this embodiment, the retry determining section 405 determines that further winding action is not required when the motor actuating time period is shorter than a predetermined time period (for example, 0.5 seconds) a predetermined number of times in a row (for example, twice in a row).

In general, as the motor is actuated in the state where the winding-up may not be possible (e.g., when the winding-up of the seat belt is completed, when it may not be possible to release the catching of the seat belt, etc.) an overload is applied to the motor after (e.g., shortly after) the actuation. Therefore, when the motor actuating time period is short a plurality of times in a row, it may be highly probable that the seat belt is in a state where winding-up may not be possible.

Figure 5:
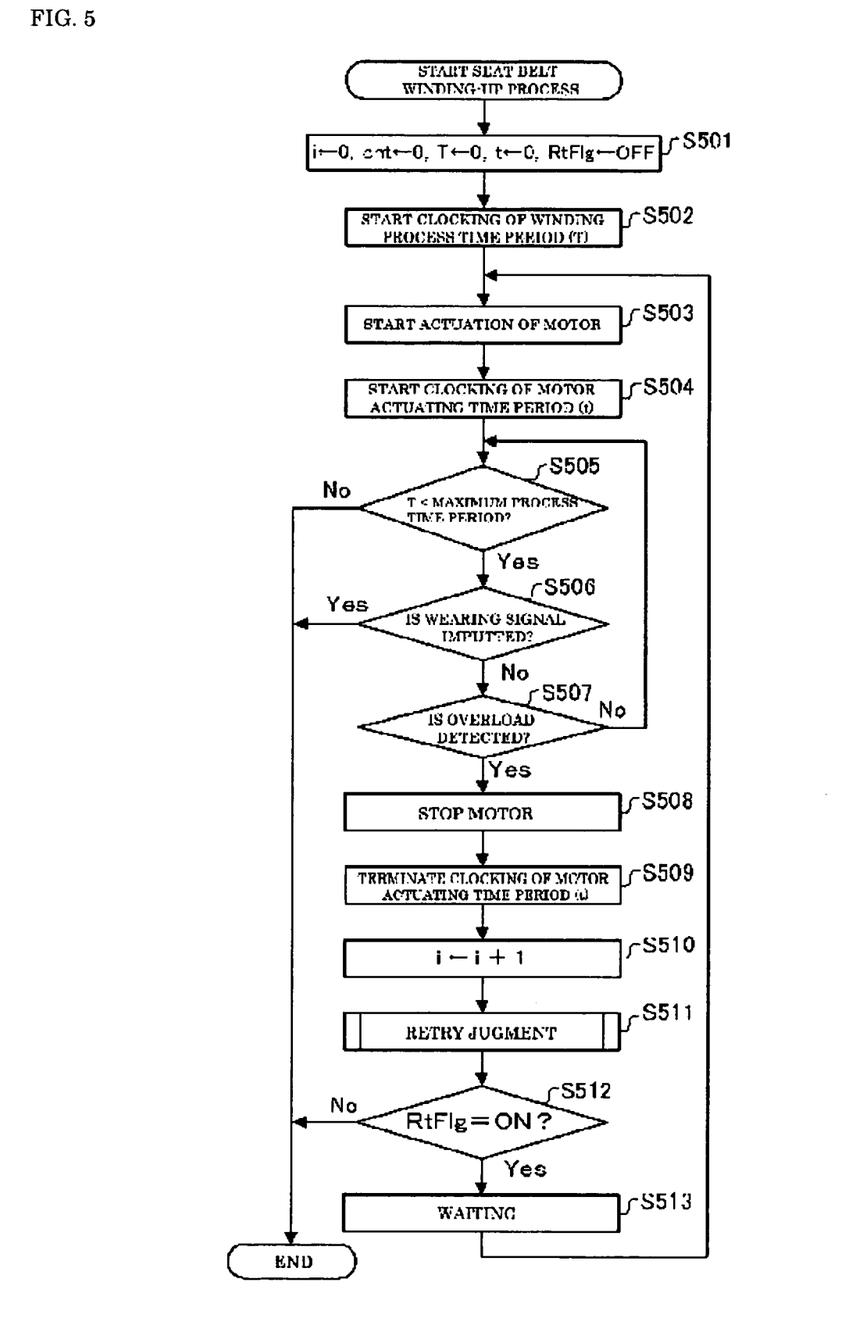
FIG. 5 is a flow chart showing procedures of the seat belt winding-up process according to the first exemplary embodiment.

FIG. 5 is a flow chart showing procedures of the seat belt winding-up process according to an exemplary embodiment. For example, as the tongue plate 5 is released from the buckle 6 by the occupant H, the seat belt wearing sensor 61 detects the release and outputs a cancellation signal to the seat belt retractor 1. The cancellation signal is inputted into the control unit 12 of the seat belt retractor 1 to start the seat belt wind-up process.

The control unit 123 of the control unit 12 sets various parameters (e.g., i, cnt, T, t, RtFlg) to be in their initial states (Step S501). "i" is a parameter in which the result of the counting (e.g., a motor actuation number) by the motor actuation counting section 404 is stored, and "cnt" is a parameter in which the number of times when the actuating time period of the motor 114 is short in a row is stored.

"T" is a parameter in which the result of the clocking (e.g., a winding process time period) by the winding process timing section 402 is stored and "t" is a parameter in which the result of the clocking (e.g., a motor actuating time period) by the motor actuation timing section 403 is stored.

"RtFlg" is a flag in which the result of the retry judgment by the retry determining section 405 is stored. If the RtFlg is ON, the motor 114 is to be actuated to wind up the seat belt 2 again. If the RtFlg is OFF, the seat belt winding-up process is terminated.

The winding process timing section 402 starts the clocking of the winding-up process (Step S502). Simultaneously, the control unit 123 outputs the actuation signal to the motor driver 121. Accordingly, the motor 114 is started to rotate so that the seat belt 2 is wound up onto the spool 112 (Step S503).

While the control unit 123 outputs the actuation signal, the motor actuation timing section 403 starts to clock the motor actuating time period (Step S504).

It is determined whether or not the winding process time period (T) is shorter than the maximum process time period (Step S505). The maximum process time period may be a time period far exceeding a normal operation time period for the seat belt winding-up process by the normal seat belt retractor 1 and the winding process time period in the normal operation may never reach the maximum process time period. When the winding-up process time period (T) reaches the maximum process time period (No in step S505), it can be determined that it may not be possible to continue the winding-up due to some defect (e.g., motor failure) so that the process is terminated. The maximum process time period may be derived from tests, measurements, and/or theory and generally is previously stored in the control parameter table in memory such as a ROM. In one exemplary embodiment, the maximum process time period is set to 10 seconds.

When the winding-up process time period (T) does not reach the maximum process time period (Yes in step S505), the control unit 123 checks whether or not the wearing signal from the seat belt wearing sensor 61 is inputted into the control unit 12 (Step S506). When the wearing signal is input (Yes in step S506), the occupant H is wearing the seat belt 2 again so that the process is terminated.

When the wearing signal is not input (No in step S506), a condition for detection of an overload is checked (Step S507). If an overload is detected (Yes in step S507), the control unit 123 stops the actuation of the motor 114 via the motor driver 121 (Step S508) and the winding-up of the seat belt 2 is stopped. If an overload is not detected (No in step S507), the processes from step S505 are repeated.

As the actuation of the motor 114 is stopped because of the detection of the overload, the motor actuation timing section 403 terminates the clocking of the motor actuating time period (step S509) and the motor actuation counting section 404 counts up the motor actuation number (i) (Step S510). The retry judgment is carried out by the retry determining section 405 (Step S511).

Figure 6:
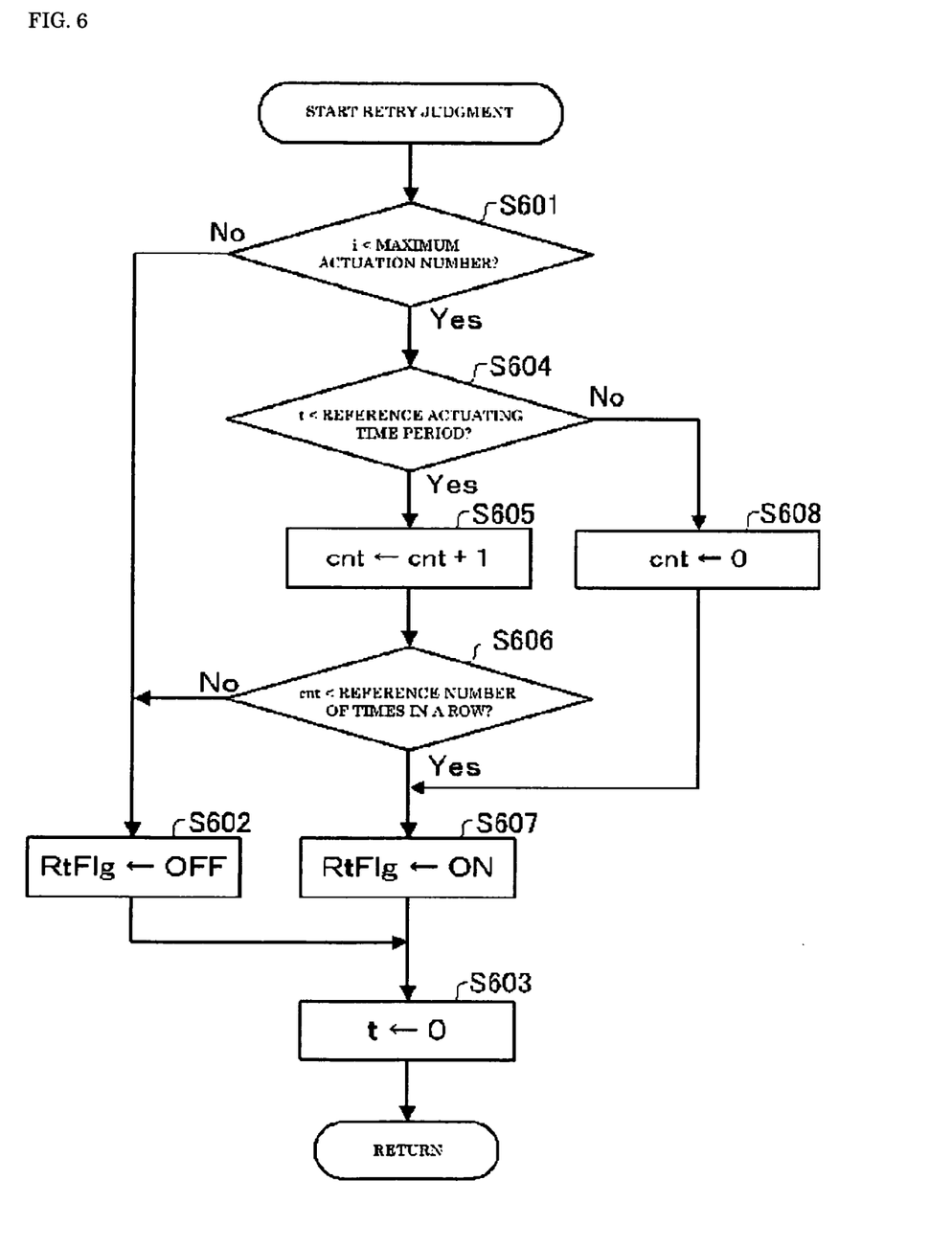
FIG. 6 is a flow chart showing procedures of the retry judgment according to the first exemplary embodiment.

FIG. 6 is a flow chart showing procedures of the retry judgment according to an exemplary embodiment.

The retry determining section 405 determines whether or not the motor actuation number (i) is lower than the maximum actuation number (Step S601). The maximum actuation number is an upper limit of the motor actuation number. According to one exemplary embodiment, the maximum actuation number is set to five. The maximum actuation number is stored in the control parameter table similarly to the maximum process time as mentioned above. When the motor actuation number (i) reaches the maximum actuation number (No in step S601), the retry determining section 405 determines that it may not be possible to wind up the seat belt 2 due to the completion of winding-up of the seat belt 2 or another reason so that the retry is not required. As a result, the retry determining section 405 sets the RtFlg to be OFF (Step S602). The motor actuating time period (t) is reset (Step S603) and the process (the retry judgment) is terminated.

When the motor actuation number (i) is lower than the maximum actuation number (Yes in step S601), it is determined whether or not the motor actuating time period (t) is short (Step S604). The determination is conducted by comparing the motor actuating time period (t) with a reference actuating time period (for example, 0.5 second) stored in the control parameter table. when the motor actuating time period (t) does not reach the reference actuating time period, i.e. is short (Yes in step S604), the number of times in a row (cnt) is counted (Step S605).

The counted number of times in a row (cnt) is compared with a reference number of times in a row (for example, two) stored in the control parameter table (Step S606). When the counted number of times in a row (cnt) is lower than the reference number of times in a row (Yes in step S606), the retry determining section 405 determines that a retry is required and sets the RtFlg to be ON (Step S607). The motor actuating time period (t) is reset (Step S603) and this process is terminated.

When the counted number of times in a row (cnt) reaches the reference number of times in a row (No in step S606), the retry determining section 405 determines that the winding-up of the seat belt 2 is completed, that it may not be possible to release the catching of the seat belt, or that it may not be possible to wind up the seat belt so that the retry is not required (Step S602). The motor actuating time period (t) is reset (Step S603) and this process is terminated.

In step S604, when the motor actuating time period (t) is not short (No in step S604), the counted number of times in a row (cnt) is reset (step S608). The retry determining section 405 determines that the retry is required and this process is terminated (Step S607, Step S603).

Returning to the flow chart of FIG. 5, when it is determined that the retry is not required as a result of the retry judgment (No in step S512), the control unit 123 terminates the process (the seat belt winding-up process). When it is determined that the retry is required (Yes in step S512), the control unit 123 suspends the process for a preset waiting time (for example, two seconds) (Step S513) stored in the control parameter table. When the waiting time elapses the process is repeated from step S503.

According to the retry function of the seat belt retractor of an exemplary embodiment, the winding-up action may not be repeated when the actuating time period of the motor 114 is short (e.g., shorter than the reference actuating time period) the reference number of times in a row (for example, twice). Therefore, the frequency of a scenario where the winding-up action is repeated even when the winding-up of the seat belt 2 is completed, when it may not be possible to release the catching of the seat belt, or when it may not be possible to wind up the seat belt (i.e., when the action of winding up the seat belt 2 is not required) may be reduced.

According to an alternative exemplary embodiment, the seat belt retractor may be different from the embodiment of FIG. 6 by the content of the retry judgment in the seat belt winding-up process. The other portions of the exemplary embodiments may be similar and description will be omitted.

Figure 7:
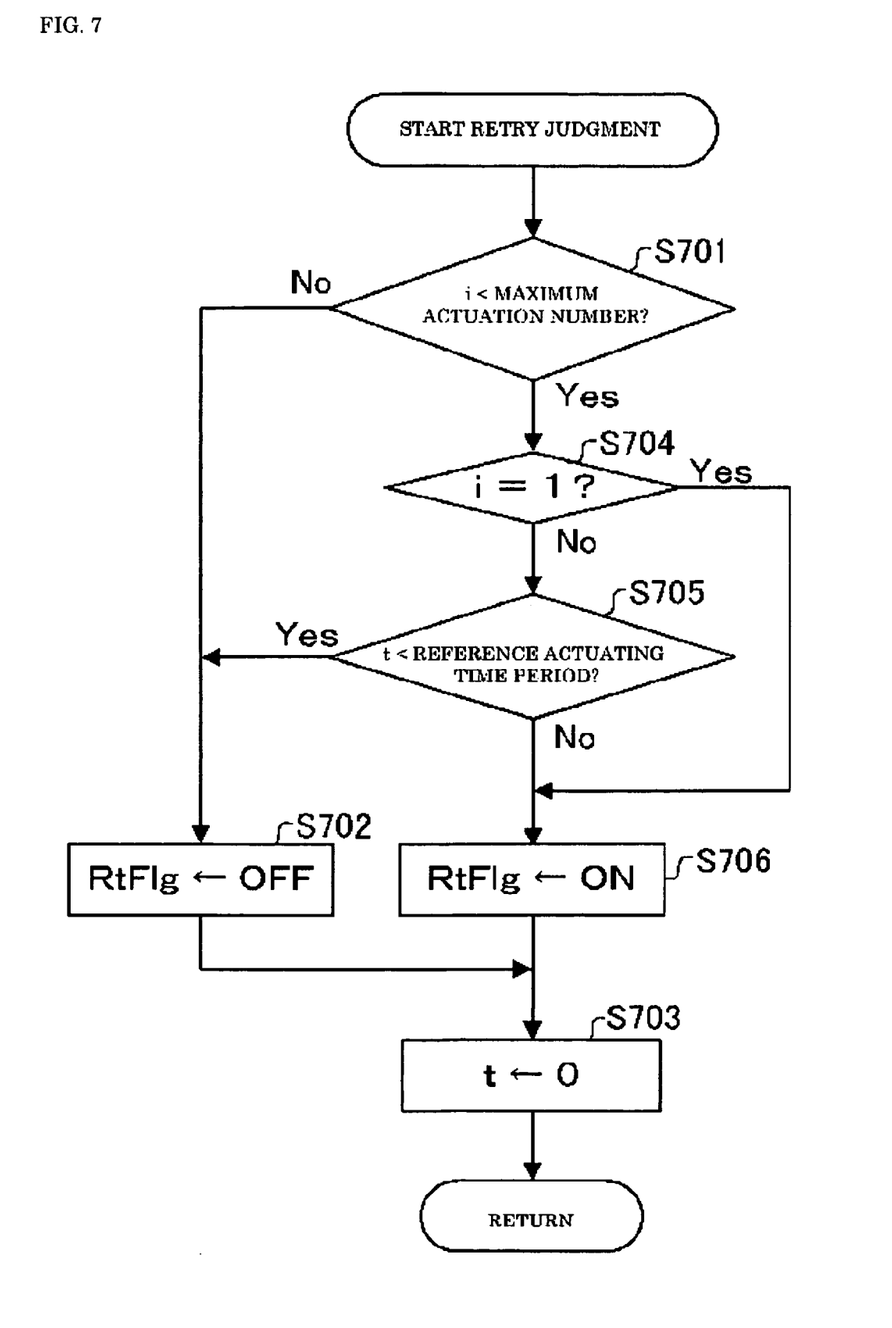
FIG. 7 is a flow chart showing procedures of the retry judgment according to a second exemplary embodiment.

FIG. 7 is a flow chart showing procedures of the retry judgment according to the alternative embodiment. The retry determining section 405 determines whether or not the motor actuation number (i) is lower than the maximum actuation number (Step S701). When the motor actuation number (i) reaches the maximum actuation number (No in step S701), similar to the process of FIG. 6, the retry determining section 405 determines that the retry is not required and terminates the process (the retry judgment) (Step S702, Step S703).

When the motor actuation number (i) is lower than the maximum actuation number (Yes in step S701), the retry determining section 405 checks whether or not the actuation of the motor 114 is the first time (Step S704). If the actuation is the first time (Yes in step S704), it is determined that the retry is required and this process is terminated (Step S706, Step 703). On the other hand, when the actuation is not the first time (i.e., the second time or more) (No in step S704), it is determined whether or not the motor actuating time period (t) is short (Step S705). When the motor actuating time period (t) is short (Yes in step S705), it is determined that the winding-up of the seat belt 2 is completed, that it may not be possible to release the catching of the seat belt, or that it may not be possible to wind up the seat belt so that the retry is not required (Step S702). The motor actuating time period (t) is reset (Step S703) and this process is terminated.

In the step S705, when the motor actuating time period (t) is not short (No in step S705), it is determined that the retry is required and this process is terminated (Step S706, Step S703).

According to the retry function of the seat belt retractor, the winding-up action may not be repeated when the actuating time period of the motor 114 restarting is short. The state where it may not be possible to wind up the seat belt, for example when the winding-up of the seat belt 2 is completed or when it may not be possible to release the catching of the seat belt, can be more precisely detected. Therefore, unnecessary actuation of the motor 114, (i.e. unnecessary winding-up action) may be avoided with greater frequency.

It should be understood that the present invention is not limited to any of the aforementioned embodiments and various changes could be made without departing from the scope of the invention.

The method of detecting an overload of the motor 114 by the overload detecting section 401 is not limited to the method based on current value (e.g., motor current value) detected by the current sensor 122 and may be any of various well-known detecting methods. For example, the control unit 12 and a sensor for measuring the tension of the seat belt 2 are connected by a wire and the overload detecting section 401 may detect an overload of the motor 114 based on the magnitude of the tension applied on the seat belt 2.

Though the aforementioned exemplary embodiments have been described with reference to an example where the seat belt apparatus is mounted to the motor vehicle seat, the present invention may be applied to an airplane in which a seat belt apparatus is mounted to a seat and is not limited to the motor vehicle.

The order of the respective processes in the flow charts described in the aforementioned embodiments is not limited to the order as described, but the order may be changed without departing from the scope of the invention.

The function of the control unit 123 can be achieved by software, hardware, or any combination thereof.

The priority application, Japanese Patent Application No. 2007-076969, filed Mar. 23, 2007 including the specification, drawings, claims and abstract, is incorporated herein by reference in its entirety.

Given the disclosure of the invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat belt retractor comprising:
a seat belt winding device for winding up a seat belt by actuation of a motor; and
a control unit that under a predetermined condition repeats a process of stopping the actuation of the motor when an overload of the motor is detected and restarting the actuation of the motor after a lapse of a predetermined time period, the control unit comprises:
a timer for clocking the time period from the start to the stop of the actuation of the motor;
a counter for counting up the number of times of starting the actuation of the motor; and
a determination module that based on the result of the timer and the counter determines whether or not actuation of the motor, which is stopped by the detection of an overload, is to be restarted.

2. A seat belt retractor as claimed in claim 1, wherein the determination module determines that the actuation of the motor is not to be restarted when a time period as the result of the clocking by the timer is shorter than a predetermined time period a plurality of times in a row.

3. A seat belt retractor as claimed in claim 1, wherein the determination module determines that actuation of the motor is not to be restarted when the actuation of a restarted motor is stopped by the detection of an overload and a time period as the result of the clocking by the timer is shorter than a predetermined time period.

4. A seat belt apparatus comprising:
a tongue plate that is slidably attached to the seat belt;
a buckle to which the tongue plate is inserted and latched; and
a seat belt retractor comprising:
a seat belt winding device for winding up a seat belt by actuation of a motor; and
a control unit that under a predetermined condition repeats a process of stopping the actuation of the motor when an overload of the motor is detected and restarting the actuation of the motor after a lapse of a predetermined time period, the control unit comprises:
a timer for clocking the time period from the start to the stop of the actuation of the motor;
a counter for counting up the number of times of starting the actuation of the motor; and
a determination module that based on the result of the timer and the counter determines whether or not actuation of the motor, which is stopped by the detection of an overload, is to be restarted.

5. A seat belt winding method for repeating, under a predetermined condition, a process of stopping the actuation of a motor, which provides power for winding up a seat belt, when an overload of the motor is detected and restarting the actuation of the motor after a lapse of a predetermined time period, comprising the steps of:
clocking a time period from the start to the stop of the actuation of the motor;
counting up the number of times of starting the actuation of the motor; and
determining whether or not actuation of the motor, which was stopped by the detection of the overload, is to be restarted based on the result obtained in the clocking step and the result obtained in the counting step.

6. The seat belt winding method as claimed in claim 5, wherein the determining step determines that actuation of the motor is not to be restarted when a time period obtained as a result from the clocking step is shorter than a predetermined time period a plurality of times in a row.

7. The seat belt winding method as claimed in claim 5, wherein the determining step determines that actuation of the motor is not to be restarted when the actuation of a restarted motor is stopped by the detection of the overload and a time period obtained as a result in the clocking step is shorter than a predetermined time period.

* * * * *

UNITED STATES PATENT AND TRADEMARK OFFICE
CERTIFICATE OF CORRECTION

| | | |
|---|---|---|
| PATENT NO. | : 7,681,683 B2 | Page 1 of 1 |
| APPLICATION NO. | : 12/076739 | |
| DATED | : March 23, 2010 | |
| INVENTOR(S) | : Takao et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 165 days.

Signed and Sealed this
Fifth Day of April, 2011

David J. Kappos
*Director of the United States Patent and Trademark Office*